United States Patent [19]

Hirata

[11] Patent Number: 5,287,333
[45] Date of Patent: Feb. 15, 1994

[54] NOTIFICATION SYSTEM WITH VOICE IN AN AUDIO SYSTEM

[75] Inventor: Hitoshi Hirata, Saitama, Japan

[73] Assignee: Pioneer Electronic Corporation, Tokyo, Japan

[21] Appl. No.: 675,769

[22] Filed: Mar. 27, 1991

[30] Foreign Application Priority Data

Apr. 28, 1990 [JP] Japan .................. 2-112829

[51] Int. Cl.⁵ .................. G08B 1/08; H04B 1/20; G11B 31/00

[52] U.S. Cl. .................. 369/4; 369/2; 369/22; 340/539; 340/692; 360/12

[58] Field of Search ........... 369/1, 2, 4, 22, 64, 369/65; 340/692, 539, 870.09; 360/12; 364/513

[56] References Cited

U.S. PATENT DOCUMENTS

| | | | |
|---|---|---|---|
| 3,908,180 | 9/1975 | Braginsky | 340/692 X |
| 3,922,716 | 11/1975 | Arnold | 369/22 X |
| 4,365,315 | 12/1982 | Jamnik | 340/692 X |
| 4,389,639 | 6/1983 | Torii et al. | 340/539 |
| 4,400,787 | 8/1983 | Mandel et al. | 340/692 X |

FOREIGN PATENT DOCUMENTS 0151561 8/1984 Japan .................. 369/2

*Primary Examiner*—Stuart S. Levy
*Assistant Examiner*—Jefferson Evans
*Attorney, Agent, or Firm*—Nikaido, Marmelstein, Murray & Oram

[57] ABSTRACT

An FM audio system has an FM tuner, a CD player, a stereo modulator for modulating an audio signal from the CD player to produce a composite signal so as to be received by the FM tuner, for reproducing the audio signal. A notification system has a controller and a muting circuit. The controller produces a control signal in response to the changing of function of the CD player. The muting circuit attenuates the audio signal from CD player in accordance with the control signal. Speech information is generated in response to the changing of the function of the CD player. The speech information is added to an attenuated audio signal and applied to the stereo modulator so as to reproduce the audio signal together with the speech information.

2 Claims, 6 Drawing Sheets

10KHz

NOTIFICATION SYSTEM WITH VOICE IN AN AUDIO SYSTEM

FIELD OF THE INVENTION

The present invention relates to a notification system with voice or speech in an audio system, and more particularly to a system for notifying a listener of information about a selected recording medium such as a CD.

BACKGROUND OF THE INVENTION

It is preferable to a user that the CD player can be connected to an FM tuner mounted on the user's car and CDs can be reproduced through the FM tuner without using a CD reproducing device.

To meet such a requirement, it has been proposed to provide an audio signal modulating system connected to the FM tuner, where an audio signal from a CD player is modulated so as to be received by the FM tuner for reproducing the CD through the FM tuner.

In such a system used in the car, it is desirable to notify the driver of information by voice, for example selected music number, selected number of movement of classical music, number of selected disk in a multidisk player which has a magazine for storing a plurality of CDs one of which is selected by manual operation.

However, if the speech information mixes with the sound of the music during the reproduction of the CD, it is difficult to listen to the information, and the mixed sound is unpleasant to the listener.

SUMMARY OF THE INVENTION

The object of the present invention is to provide a notification system which may solve the above described problem.

In accordance with the present invention, the system is designed that the reproduced sound is attenuated during presentation of the speech information.

According to the present invention, there is provided a notification system in an audio system having an FM tuner, a recording medium reproducing device, stereo modulator means for modulating an audio signal from the recording medium reproducing device to produce a composite signal so as to be received by the FM tuner for reproducing the audio signal.

The notification system comprises a control device responsive to operation for changing a function of the recording medium reproducing device for producing a control signal, a muting circuit responsive to the control signal for attenuating to a reduced level the audio signal from the recording medium reproducing device, a speech information producing device responsive to the changing of the function of the recording medium reproducing device for producing a speech information signal about the changed function, and a device for adding the speech information signal to the attenuated audio signal and for applying the combined audio signal to the stereo modulator device.

In an aspect of the present invention, the muting circuit comprises a circuit for short-circuiting two lines for stereo audio signals.

The other objects and features of this invention will become understood from the following description with reference to the accompanying drawings.

DETAILED DESCRIPTION OF THE PREFERRED EMBODIMENTS

Figure 1:
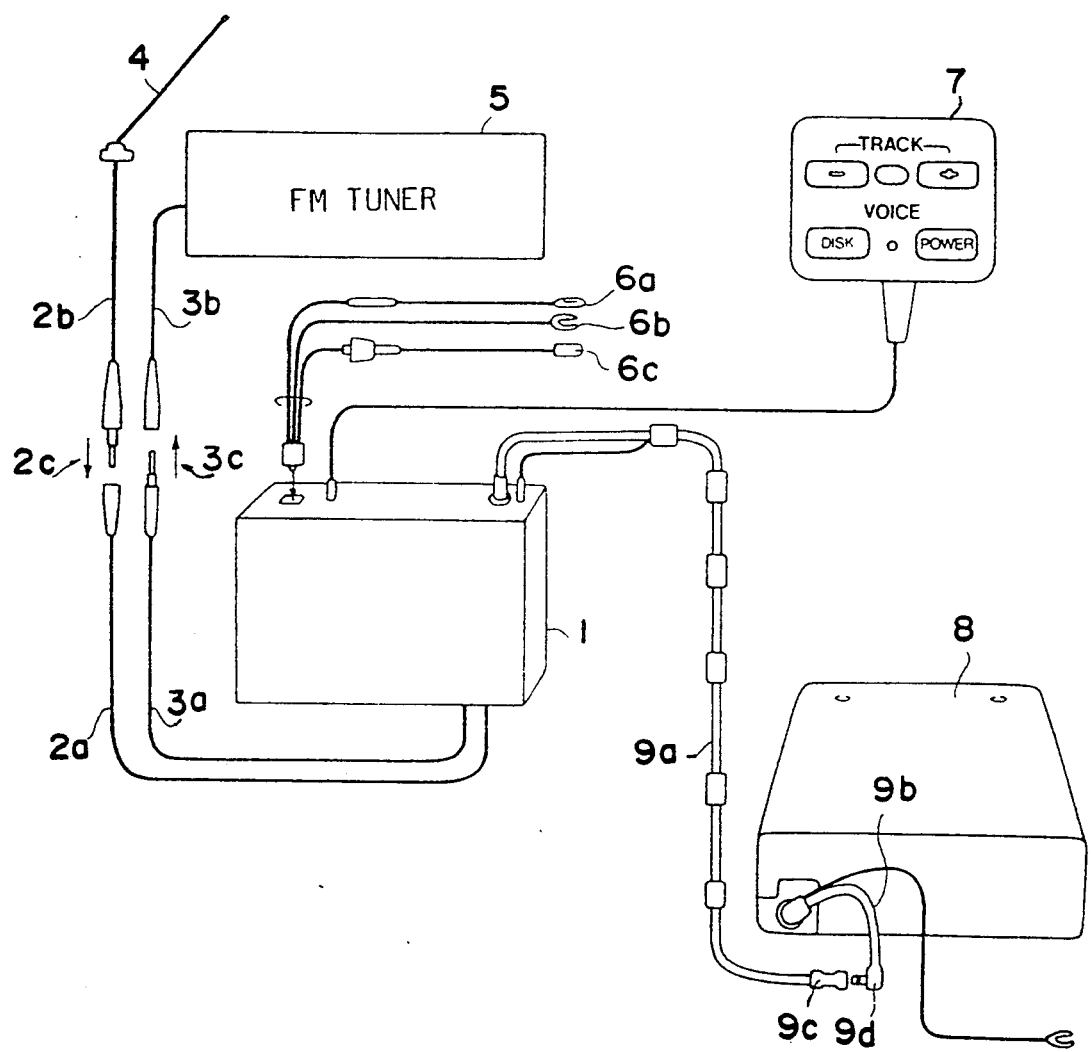
FIG. 1 is a schematic illustration showing a car audio system using an audio signal modulating device according to the present invention.
Figure 3:
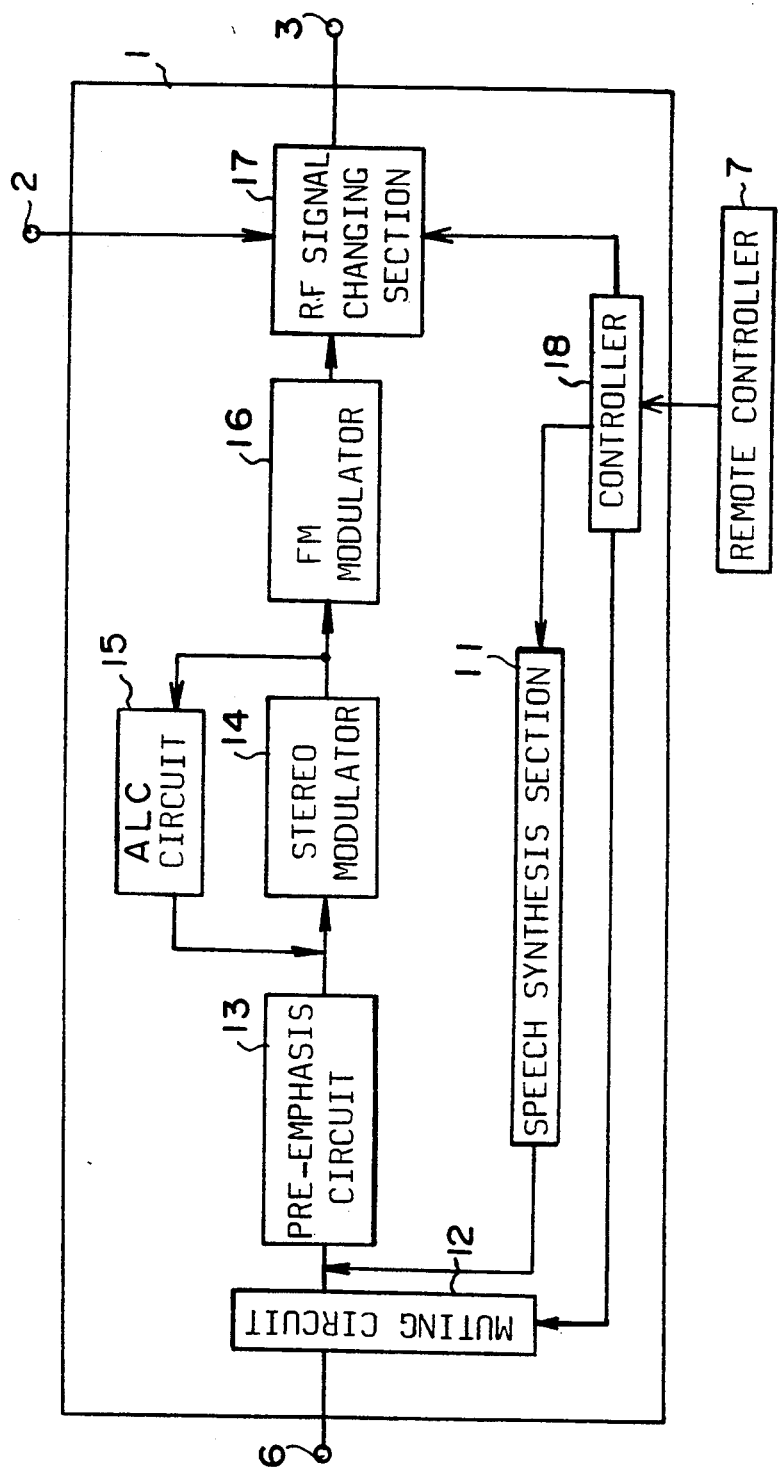
FIG. 3 is a block diagram showing the audio signal modulating device.

Referring to FIGS. 1 and 3, an audio signal modulating device 1 has an antenna terminal 2, an RF output terminal 3, and an audio input terminal 6. The antenna terminal 2 is connected to an antenna 4 of a car through cords 2a and 2b and a connector 2c, and the RF output terminal 3 is connected to an antenna terminal of an FM tuner 5 through cords 3a and 3b and a connector 3c. The audio input terminal 6 is connected to an output terminal of a multi-CD player 8 through coaxial cables 9a and 9b and connectors 9c and 9d. Furthermore, a source cord 6a for accessaries, a grounding cord 6b, and a power supply cord 6c are connected to the audio signal modulating device 1. The multi-CD player 8 has a magazine containing a plurality of CDs.

Figure 2:
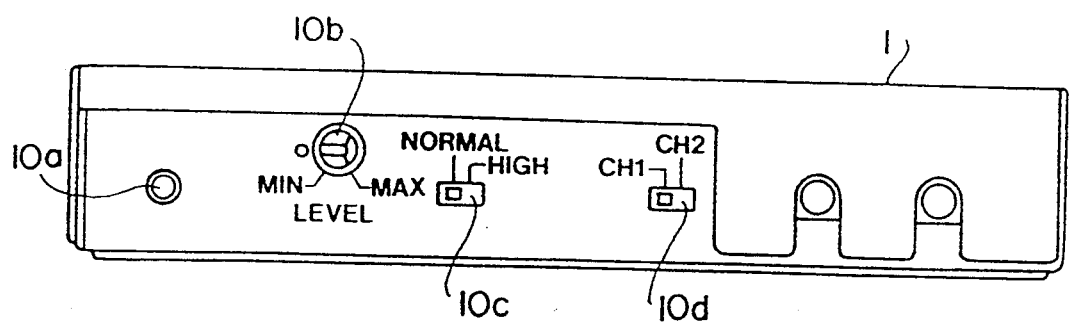
FIG. 2 is a front view of the audio signal modulating device.

FIG. 2 shows the front of the audio signal modulating device 1. The device has a clear button 10a, a modulation rate control knob 10b, a high frequency adjusting switch 10c, and a channel selector 10d. The modulation rate control knob 10b is provided for adjusting the volume and for reducing the modulation rate for reducing the distortion. The high frequency adjusting switch 10c is provided for adjusting high-pitched tone.

The audio signal modulating device 1 produces two RF signals having different frequencies, for example 76.4 MHz and 76.9 MHz which are distinguished from the frequencies of FM broadcasting. The channel selector 10d is provided for selecting one of channels CH1 and CH2 in order to select reproduction having lesser interference.

Referring to FIG. 3, the audio signal modulating device 1 has a speech synthesis section 11 for generating speech information, a muting circuit 12 for reducing level of the audio input signal during input of the speech information, a pre-emphasis circuit 13, a stereo modulator 14, an automatic level controller (ALC) 15, an FM modulator 16, an RF signal changing section 17, and a controller 18.

The speech synthesis section 11 responds to a control signal from the controller 18 to generate speech information about the number of a selected disk in the magazine, CD number and other in Japanese and English.

Figure 4:
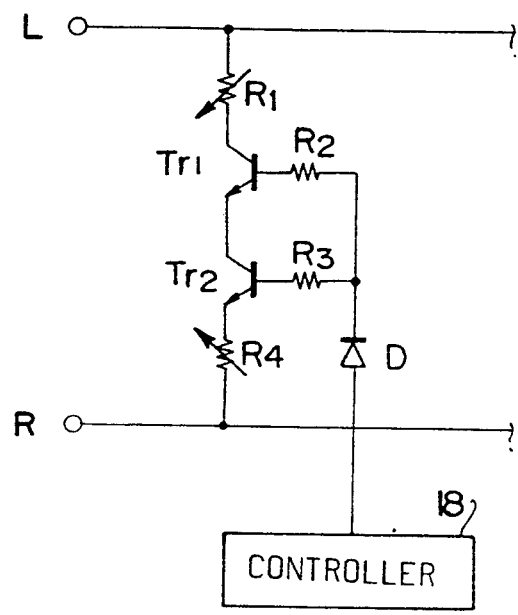
FIG. 4 is a muting circuit used in the audio signal modulating device.

Referring to FIG. 4, the muting circuit 12 comprises a pair of transistors Tr1 and Tr2 connecting a left audio signal line L and a right audio signal line R, variable resistors R1, R4 connected to the transistors in series, resistors R2, R3 connected to bases of both transistors and a diode D for applying a control signal from the controller 18 to both transistors Tr1 and Tr2.

Figure 5:
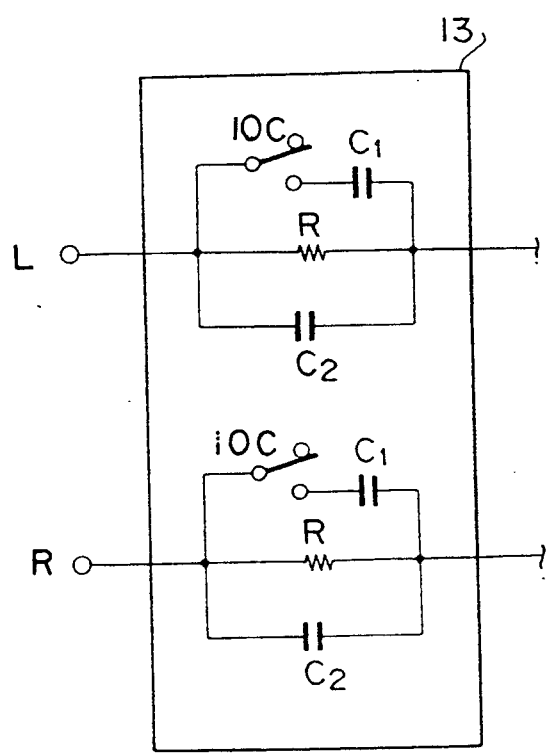
FIG. 5 is a pre-emphasis circuit used in the device.
Figure 6A:
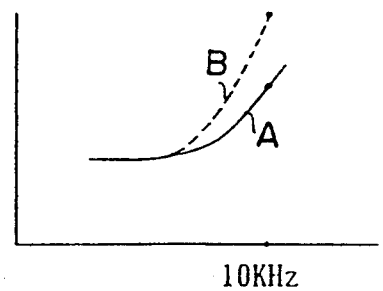
FIGS. 6a to 6c are graphs showing effect of pre-emphasis circuit.
Figure 6B:
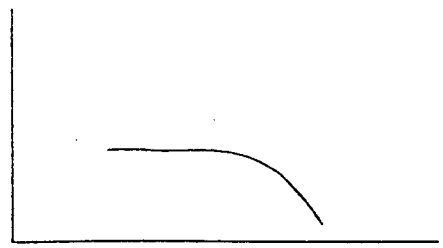
Figure 6C:
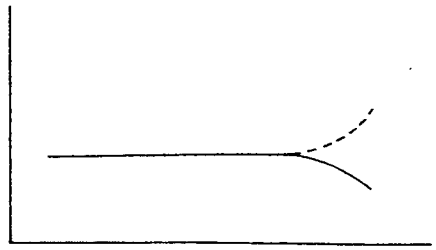

In the FM broadcasting, the high audio frequencies are emphasized. Accordingly, the FM tuner 5 has a de-emphasis circuit for obtaining a flat frequency characteristic. In order to meet the de-emphasis operation of the FM tuner 5, the device 1 is provided with the pre-emphasis circuit 13. As shown in FIG. 5, the pre-emphasis circuit 13 comprises capacitors C1 and C2, a resistor R which are connected in parallel on each of the left and right audio signal lines L and R, and the high frequency adjusting switch 10c. The capacitor C2 is provided for an ordinary pre-emphasis, and the capacitor C1 is provided to meet the de-emphasis of the FM tuner 5. When the switch 10c is closed, the time constant rises from, for example, 75 μsec to 150 μsec. In FIG. 6a, line A shows an ordinary pre-emphasis characteristic, and line B represents a raised pre-emphasis characteristic by the capacitor C1. FIG. 6b shows a de-emphasis characteristic of the FM tuner 5. Thus, as shown in FIG. 6c, a flat frequency characteristic is obtained. The stereo modulator 14 modulates the audio signal from the CD to an RF signal, that is a composite signal, so as to be received by the FM tuner 5.

When the percentage modulation rate of the stereo modulator 14 exceeds 100 percent, distortion generates. The ALC circuit 15 detects the level of the composite signal from the stereo modulator 14 and operates to control the input signal to the stereo modulator so as to prevent the percentage modulation rate from exceeding 100%. It is preferable to restrict the percentage modulation rate to 70~80%.

The FM modulator 16 operates to select one of the frequencies 76.4 MHz and 76.9 MHz in response to the operation of the channel selector 10d.

The RF signal changing section 17 is provided for changing the output RF signal of the device to the CD reproduction or the FM broadcasting. The controller 18 operates to actuate the muting circuit 12 and the RF signal changing section 17 in response to the instruction from a remote controller 7 shown in FIG. 1.

Figure 7:
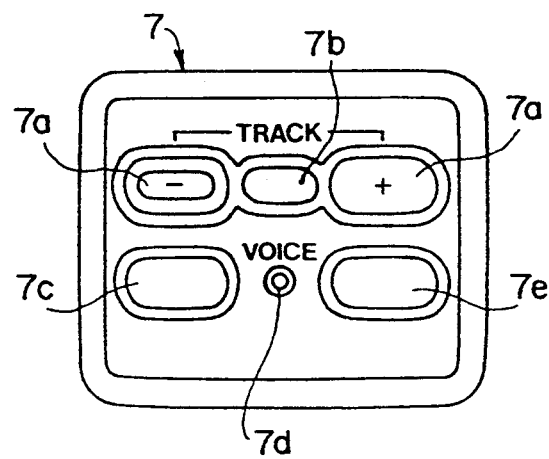
FIGS. 7 and 8 show remote controllers.

Referring to FIG. 7, the remote controller 7 has an up/down key 7a for increasing and decreasing the track number of the disk to be selected, a speech change key 7b for selecting Japanese information or English information, a disk select key 7c for selecting one of the disks in the magazine, a power indicator 7d, and an ON/OFF switch 7e.

Figure 8:
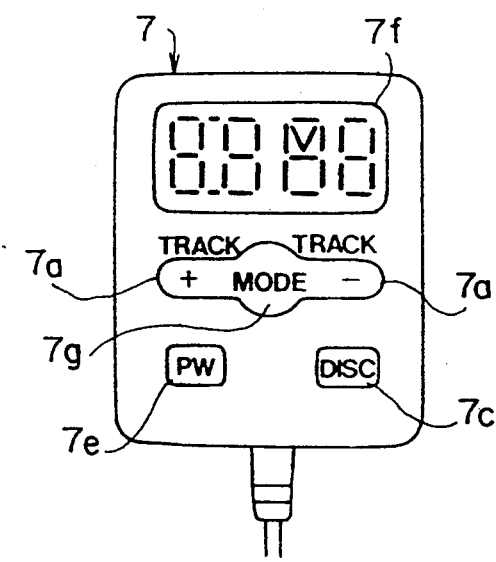

FIG. 8 shows another example of the remote controller 7. The remote controller 7 has a liquid crystal display 7f for displaying the selected disk, track number, and others and a mode key 7g for selecting a repeat, random or normal play.

In operation, when one of the disks and the track number are selected by operating the up/down key 7a and the disk select key 7c, the selected disk number and track number are notified in Japanese or English. The audio signal from the multi-CD player 8 is input in the pre-emphasis circuit 13 through muting circuit 12 where a high frequency range is raised. If distortion generates, the high frequency adjusting switch 10c is opened to select the ordinary pre-emphasis characteristic A of FIG. 6a, or the modulation rate control knob 10b is set to a MIN position to reduce the modulation rate, thereby reducing the distortion.

The emphasized audio signal is modulated to the composite signal so as to be received by the FM tuner 5. The ALC circuit 15 operates to prevent the percentage modulation rate from exceeding 100%. The FM modulator 16 selects one of the frequencies 76.4 MHz and 76.9 MHz in accordance with the selection of the channel selector 10d. The RF signal having the selected frequency is applied to the FM tuner 5 through the RF signal changing section 17.

When the up/down key 7a and/or the disk select key 7c is operated during the reproduction of a CD, the remote controller 7 produces a signal which is applied to the controller 18. The controller 18 applies a control signal to the muting circuit 12, which renders the transistors Tr1 and Tr2 conductive. Thus, the lines L and R are short-circuited to reduce the level of audio signal generated therefrom. On the other hand, the speech synthesis section 11 produces speech information about the key operation, in response to the control signal. Thus, the volume based on the audio signal is attenuated to a lower level, so that the speech information from the speech synthesis section 11 is clearly audible. By adjusting the resistances of the variable resistors R1 and R4, the volume can be adjusted.

Furthermore, when the speech change key 7b is operated during the reproduction of the CD, the speech synthesis section 11 produces information about the disk number and the track number of the playing CD.

Although the above described embodiment relates to CD reproduction, other recording medium such as a cassette tape player can be used in the system of the present invention. Furthermore, the present invention may be applied to other audio systems than the car stereo.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A notification system in an audio system having an FM tuner, a recording medium reproducing device, and stereo modulator means for modulating an audio signal from the recording medium reproducing device to produce a composite signal so as to be received by the FM tuner for reproducing the audio signal, the notification system comprising:

control means for changing a function of the recording medium reproducing device and for producing a control signal;

a muting circuit, connecting to said control means and responsive to the control signal, for producing an audio signal of reduced level from the recording medium reproducing device;

speech information producing means, connected to said control means and responsive to the changing of the function of the recording medium reproducing device, for producing speech information corresponding to the changed function; and combining means, connected to the muting circuit and speech information producing means, for combining the speech information with said reduced level audio signal and for applying the combined audio and speech information signal to the stereo modulator means to create said composite signal.

2. The system according to claim 1 wherein the muting circuit comprises a circuit which short-circuits audio signal lines for stereo audio signals.

* * * * *